US009886697B1

(12) United States Patent
Sivertsen

(10) Patent No.: US 9,886,697 B1
(45) Date of Patent: Feb. 6, 2018

(54) SYSTEMS AND METHODS FOR DISTRIBUTING SEGMENTED MEDIA CONTENT TO SIGNAGE DEVICES IN PRIVATE NETWORKS

(71) Applicant: AMERICAN MEGATRENDS, INC., Norcross, GA (US)

(72) Inventor: Clas Gerhard Sivertsen, Lilburn, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 29 days.

(21) Appl. No.: 14/104,775

(22) Filed: Dec. 12, 2013

(51) Int. Cl.
G06Q 30/00 (2012.01)
G06Q 30/02 (2012.01)
G05B 19/418 (2006.01)

(52) U.S. Cl.
CPC .................. G06Q 30/0241 (2013.01)

(58) Field of Classification Search
CPC ................................ G06Q 30/0241
USPC ......................................... 705/14.4
See application file for complete search history.

(56) References Cited

U.S. PATENT DOCUMENTS

| 6,571,279 | B1 | 5/2003 | Herz et al. | |
|---|---|---|---|---|
| 7,146,567 | B1* | 12/2006 | Duczmal | G06Q 30/02 715/730 |
| 8,413,153 | B2* | 4/2013 | Harris et al. | 718/102 |
| 2002/0013757 | A1 | 1/2002 | Bykowsky et al. | |
| 2003/0149601 | A1* | 8/2003 | Cabral | 705/5 |
| 2004/0015399 | A1 | 1/2004 | Maggio | |
| 2004/0054589 | A1 | 3/2004 | Nicholas et al. | |
| 2004/0174597 | A1 | 9/2004 | Craig et al. | |
| 2007/0136133 | A1 | 6/2007 | Li | |
| 2007/0288350 | A1 | 12/2007 | Bykowsky | |
| 2008/0301794 | A1* | 12/2008 | Lee | H04L 63/0281 726/11 |
| 2009/0012868 | A1 | 1/2009 | DeAngelis et al. | |
| 2009/0030788 | A1 | 1/2009 | Boudah et al. | |
| 2009/0144157 | A1 | 6/2009 | Saracino et al. | |

(Continued)

OTHER PUBLICATIONS

A Cloud-based Signage Network System. Yan Peng. School of Computer Engineering, Shenzhen Polytechnic, Shenzhen, GuangDong, 518055, China. Date of Conference: Jun. 29-30, 2013. Date Added to IEEE Xplore: Sep. 16, 2013. ISBN: 978-0-7695-5016-9.*

Primary Examiner — Victoria Vanderhorst
(74) Attorney, Agent, or Firm — Locke Lord LLP; Tim Tingkang Xia, Esq.

(57) ABSTRACT

Certain aspects direct to systems and methods for distributing segmented media content to digital signage devices in a private network. In certain embodiments, the system includes a Media Content Distribution System (MCDS). Upon receiving an instruction to distribute an item of media content, the MCDS retrieves and segments the item from a storage server, and stores the segments in the storage server. When a first digital signage device requests for a segment, the MCDS transmits a storage link of the requested segment to the first digital signage device. Thus, the first digital signage device may retrieve the requested segment from the storage server, and send an address identifying a storage location of the requested segment stored in the private network back to the MCDS. When a second digital signage device also requests for the same segment, the MCDS transmits the address to the second digital signage device.

25 Claims, 4 Drawing Sheets

(56) References Cited

U.S. PATENT DOCUMENTS

| | | |
|---|---|---|
| 2010/0191600 A1 | 7/2010 | Sideman |
| 2011/0035287 A1 | 2/2011 | Fox |
| 2011/0055915 A1* | 3/2011 | Hall .................... H04L 63/0281 726/12 |
| 2011/0106618 A1 | 5/2011 | Ben-Moshe |
| 2011/0125588 A1 | 5/2011 | Turner et al. |
| 2011/0178878 A1 | 7/2011 | Bailout Rabih |
| 2011/0282727 A1* | 11/2011 | Phan et al. ................. 705/14.36 |
| 2011/0288915 A1 | 11/2011 | Mochizuki |
| 2012/0047020 A1 | 2/2012 | Urban et al. |
| 2012/0130855 A1 | 5/2012 | Nielson et al. |
| 2012/0150586 A1 | 6/2012 | Harper et al. |
| 2013/0185162 A1 | 7/2013 | Mo |
| 2013/0212619 A1* | 8/2013 | Yerli ............................... 725/32 |
| 2014/0067549 A1 | 3/2014 | Park et al. |
| 2014/0122248 A1* | 5/2014 | Kuzama et al. ........... 705/14.66 |
| 2014/0222578 A1 | 8/2014 | Poornachandran et al. |

* cited by examiner

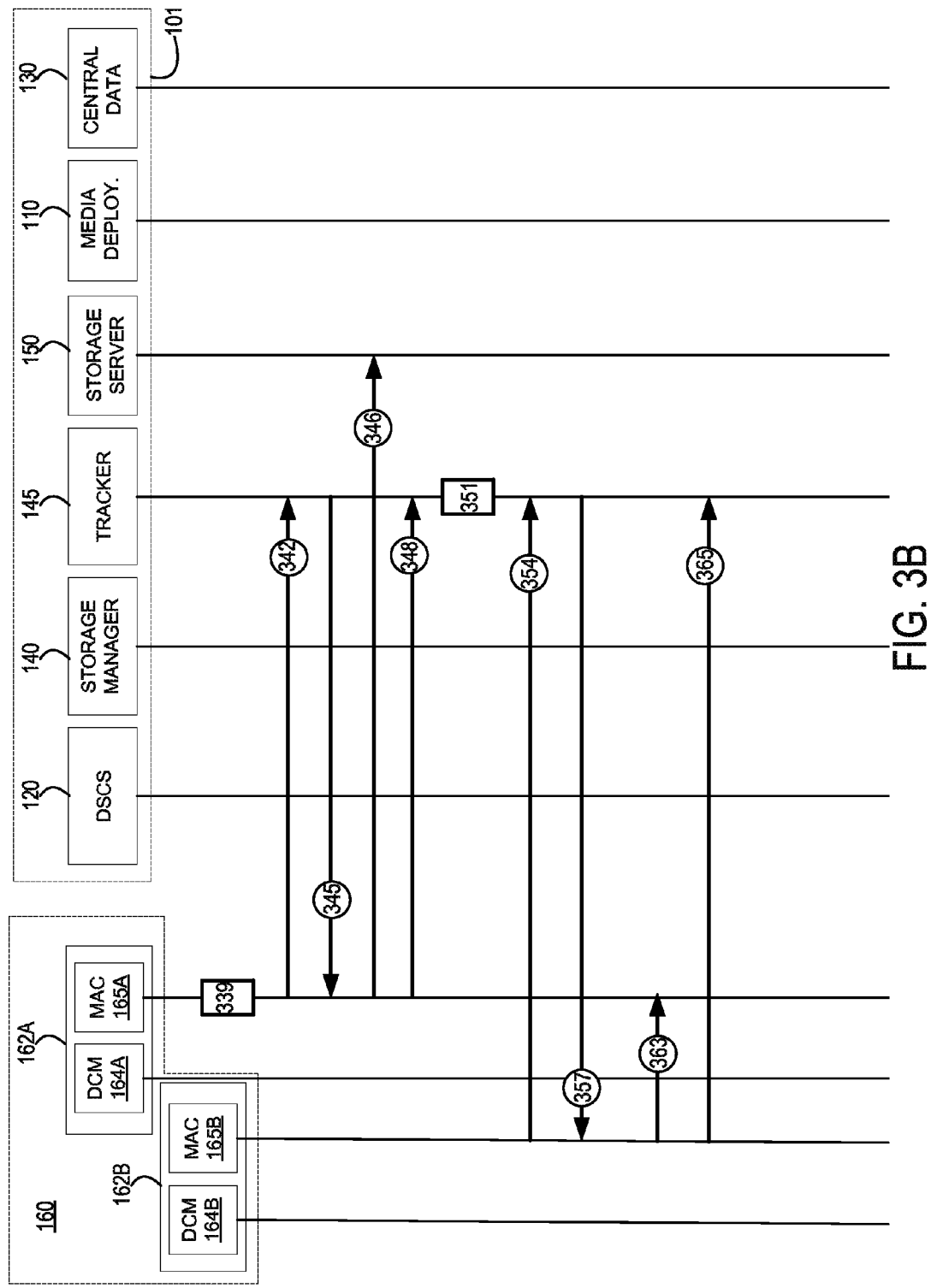

SYSTEMS AND METHODS FOR DISTRIBUTING SEGMENTED MEDIA CONTENT TO SIGNAGE DEVICES IN PRIVATE NETWORKS

FIELD

The present systems and methods relate generally to computer hardware and software systems for distributing media content to networks of digital signage devices, and more particularly to systems and methods for processing media content to facilitate distribution to signage devices in private networks wherein media content is more efficiently distributed to the private network and can be shared among signage devices within the private network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Traditionally, if an advertiser wanted to display content on each of the signage devices in the network, one option would be to physically deliver the content to a network administrator who would then upload the content to each of the signage devices individually. For example, an advertiser could mail a USB mass storage device (i.e., "thumb drive") to the network administrator who would then upload the content at each signage device, where it could then be displayed. As will be understood and appreciated, such a process is both time consuming and difficult to manage as someone must walk from signage device to signage device while keeping track of each upload.

Alternatively, if the private network was appropriately configured, an advertiser could send the media content to each individual signage device in the network via a network connection (e.g., via an Internet connection). This approach is likewise disadvantageous because each instance of the media content necessarily must be filtered through the router or other entry point into the network. As will be understood and appreciated, this often causes a severe bottleneck at the network entry point and slows down delivery of content to the signage devices. Further, such a configuration leaves private networks having signage devices vulnerable to attacks from hackers or others with malicious intentions who may wish, for example, to display inappropriate content on the signage devices in the network.

Therefore, there is a long-felt but unresolved need for a system for efficiently and effectively delivering media content that is also capable of processing the content for delivery to a specific private network of digital signage devices, wherein the system is configured to deliver the content in response to a request from a signage device within the private network. Likewise, there is a need for a system capable of tracking delivery of processed content to the private network to prevent redundant transmission of media content to the network.

BRIEF SUMMARY OF THE DISCLOSURE

Certain aspects of the present disclosure direct to a method for distributing media content with a Media Content Distribution System (MCDS), including: receiving, at a Media Deployment Module (MDM) of the MCDS, an instruction to distribute an item of media content to a plurality of digital signage devices in a private network, wherein the plurality of digital signage devices comprises a first digital signage device and a second digital signage device; retrieving the item of media content from a storage server of the MCDS based on information in the received instruction; segmenting, at the MCDS, the retrieved item of media content into segments based on information in the received instruction; storing the segments in the storage server; obtaining storage links respectively identifying locations of the segments stored in the storage server; upon receipt at the MCDS of a request for one of the segments from the first digital signage device within the private network, transmitting the storage link identifying the location of the requested one of the segments to the first digital signage device; receiving a first address identifying a storage location of the requested one of the segments stored in the private network; and upon receipt at the MCDS of a request for the requested one of the segments from the second digital signage device within the private network, transmitting the first address to the second digital signage device.

In certain embodiments, the received instruction comprises a Campaign Deployment Plan.

In certain embodiments, the item of media content is segmented based on the number of the digital signage devices in the private network.

In certain embodiments, the method further includes generating, at the MCDS, a media content identification file identifying the segments.

In certain embodiments, the media content identification file includes descriptors respectively identifying the segments.

In certain embodiments, each of the descriptors includes an authentication tag. In certain embodiments, the authentication tag is a cryptographic hash.

In certain embodiments, the media content identification file further includes information identifying the digital signage devices in the private network.

Certain aspects of the present disclosure direct to a method for distributing media files among a plurality of digital signage devices in a private network, including: transmitting, from a Device Control Module (DCM) of a first digital signage device of the plurality of digital signage device, an inquiry for available media files to a Media Content Delivery System (MCDS), wherein each of the plurality of digital signage devices comprises a DCM, wherein the DCMs of the digital signage devices are in electronic communication with each other and with the MCDS, and wherein the plurality of digital signage devices comprises the first digital signage device and a second digital signage device; upon receipt of a media content identification file at the DCM of the first digital signage device, executing the media content identification file, wherein the media content identification file identifies segments of a media file; transmitting from the DCM of the first digital signage device a request for one of the segments identified in the executed media content identification file to the MCDS; upon receipt of the requested one of the segments from the MCDS, making available at the DCM of the first digital signage device the requested one of the segments to the digital signage devices in the private network; and upon receipt of a request for the requested one of the segments from the second digital signage device in the private network, transmitting the requested one of the segments to the second digital signage device.

In certain embodiments, the media content identification file includes descriptors respectively identifying the segments.

In certain embodiments, each of the descriptors includes an authentication tag. In certain embodiments, the authentication tag is a cryptographic hash.

In certain embodiments, the method further includes authenticating the requested one of the segments by comparing the requested one of the segments to information in the media content identification file.

Certain aspects of the present disclosure direct to a system, including a Media Content Distribution System (MCDS) in operative connection with a private network. In certain embodiments, the MCDS includes a Media Deployment Module (MDM) and a storage server, wherein the private network comprises a plurality of digital signage devices, and wherein the plurality of digital signage devices comprises a first digital signage device and a second digital signage device. The MCDS is configured to receive, at the MDM, an instruction to distribute an item of media content to the plurality of digital signage devices, retrieve the item of media content from the storage server based on information in the received instruction, segment the retrieved item of media content into segments based on information in the received instruction, store the segments in the storage server, obtain storage links respectively identifying locations of the segments stored in the storage server, upon receipt of a request for one of the segments from the first digital signage device, transmit the storage link identifying the location of the requested one of the segments to the first digital signage device, receive a first address identifying a storage location of the requested one of the segments stored in the private network, and upon receipt of an inquiry for the requested one of the segments from the second digital signage device, transmit the first address to the second digital signage device.

In certain embodiments, the received instruction comprises a Campaign Deployment Plan.

In certain embodiments, the item of media content is segmented based on the number of the digital signage devices in the private network.

In certain embodiments, the method further includes generating, at the MCDS, a media content identification file identifying the segments.

In certain embodiments, the media content identification file includes descriptors respectively identifying the segments.

In certain embodiments, each of the descriptors includes an authentication tag. In certain embodiments, the authentication tag is a cryptographic hash.

In certain embodiments, the media content identification file further includes information identifying the digital signage devices in the private network.

In certain embodiments, each of the digital signage devices comprising a Device Control Module (DCM), wherein the DCMs of the digital signage devices are in electronic communication with each other and with the MCDS.

In certain embodiments, the DCM of the first signage device is configured to transmit an inquiry for available media files to the MCDS, upon receipt of the media content identification file, execute the media content identification file, transmit the request for the one of the segments to the MCDS, upon receipt of the requested one of the segments from the MCDS, make available the requested one of the segments to the digital signage devices in the private network, and upon receipt of a request for the requested one of the segments from the second signage device, transmit the requested one of the segments to the second signage device.

In certain embodiments, the second digital signage device is configured to send the request for the requested one of the segments to the DCM of the first digital signage device based on the first address received from the MCDS.

In certain embodiments, the DCM of the first digital signage device is further configured to authenticate the requested one of the segments by comparing the requested one of the segments to information in the media content identification file.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIGS. 3A and 3B are a sequence diagram showing an exemplary computer-implemented process wherein an MCDS receives a media deployment plan and subsequently receives a request for content from a digital signage device within a network. The sequence diagram shows the steps whereby the media content is preprocessed and delivered to the specified private network having signage devices.

DETAILED DESCRIPTION

Figure 1:
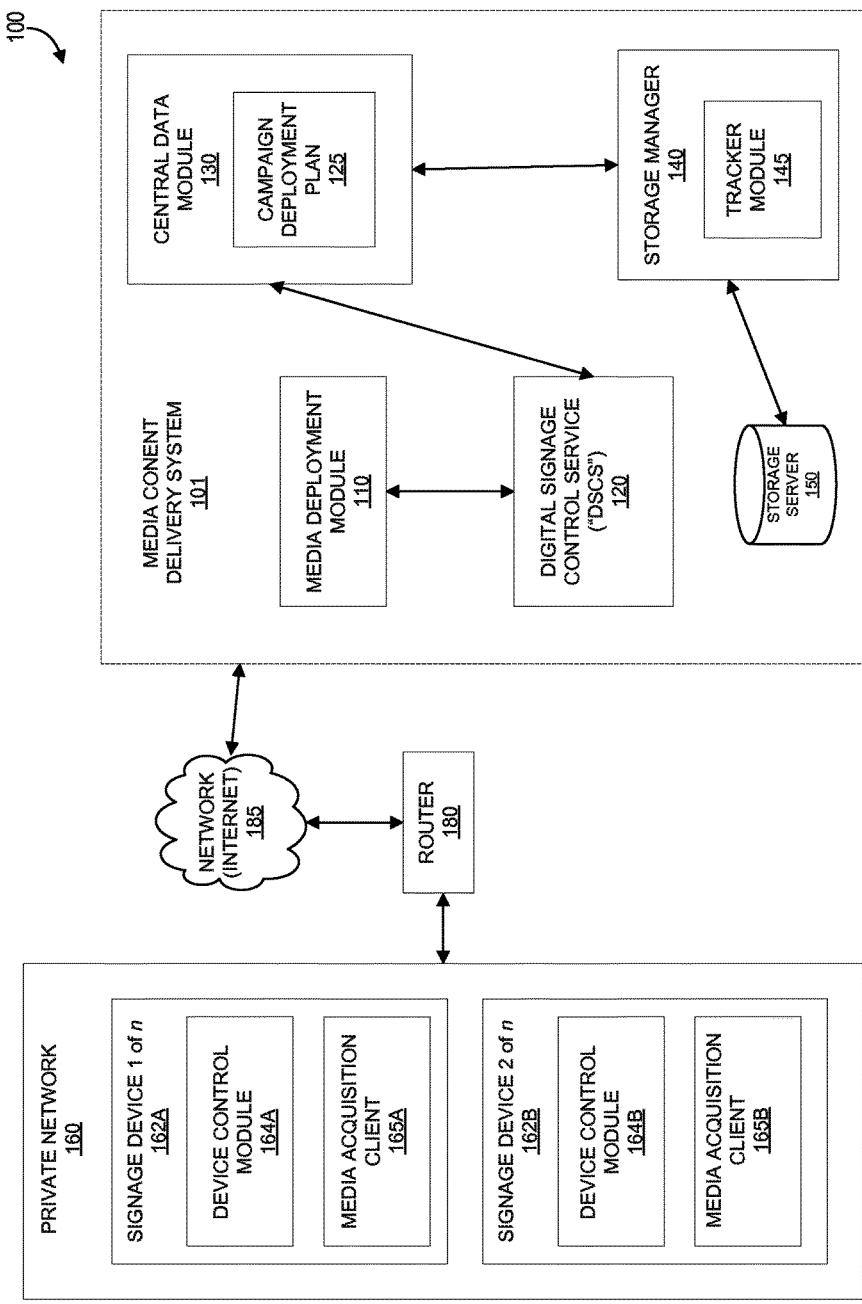
FIG. 1 illustrates an exemplary system environment in which an embodiment of the disclosed media content delivery system ("MCDS") is utilized.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Aspects of the present disclosure relate generally to computer hardware and software systems for distributing media content to networks of digital signage devices. In certain embodiments, a signage device for a group of signage devices can be deployed in a private network behind a firewall implemented by a router. According to one aspect, a Media Content Delivery System ("MCDS") facilitates delivery of media content to a particular digital signage device or group of digital signage devices.

According to one aspect, after receiving a Campaign Deployment Plan, which typically specifies which media content to display, when and where the content should be displayed, and for how long the content should be displayed, the MCDS waits for a request for content from a signage device within the private network 160. According to one aspect, once the request is received, the MCDS begins preprocessing the content and creating a Media Content Identification File ("MCIF") containing information about the processed media content, which is distributed to signage devices in the network that request content. Further, according to one aspect, upon receipt and execution of the MCIF at the signage device, the MCDS begins transmitting individual segments of content to the requesting signage device while simultaneously tracking requests and transmissions of content. According to a further aspect, content segments received at a signage device within the network are shared with the other signage devices in the network until each signage device has received each segment of the media content. Finally, according to yet another aspect of the present embodiment, once a signage device has received each segment of media content, the segments are reassembled such that the content can be displayed on the signage device according to the parameters established in the Media Deployment Plan.

Referring now to the figures, FIG. 1 illustrates an overview 100 of a Media Content Delivery System ("MCDS") 101 in an exemplary environment, constructed and operated in accordance with various aspects of the present disclosure. As shown in FIG. 1, the MCDS 101 comprises a Digital Signage Control Service ("DSCS") 120 and Storage Manager 140 for carrying out and coordinating various computer-implemented processes of the MCDS 101. The exemplary MCDS 101 also comprises a Central Data Module 130 and Media Deployment Module 110 for carrying out various other computer-implemented processes of the MCDS 101. Embodiments of the MCDS 101 further comprise various storage servers for storing system data and media content, such as storage server 150. Architectural details relating to various software modules, engines, and databases comprising an embodiment of the MCDS 101 are described in greater detail below in relation to FIGS. 1 and 2.

As discussed and according to the embodiment shown in FIG. 1, an MCDS 101 comprises a DSCS 120, a Storage Manager 140, and various other software engines, modules, and databases, which are operatively connected through a computer network 185. Typically, such operative connections involve a secure connection or communications protocol, and communications over a network typically involve the use of one or more services such as a Web-deployed service with client/server architecture, a corporate Local Area Network ("LAN") or Wide Area Network ("WAN"), or through a cloud-based system. According to a further embodiment not shown in FIG. 1 and as will be understood by one of ordinary skill in the art, an MCDS 101 may comprise a unitary system, or the functionalities can be carried out by a consolidated system, and it is unnecessary for these systems to be separate and discrete.

The MCDS 101 is in communication with a communication network 185 (such as Internet). A private network 160, having one or more digital signage devices, is in communication with the communication network 185 through an entry point such as a router 180. Although FIG. 1 only shows that the signage devices are deployed in one private digital network 160, it will be understood and appreciated by one of ordinary skill in the art that signage devices can be configured as multiple private digital networks. Further, digital signage devices may be connected to an MCDS 101 directly through the network 185. Operative connections between an MCDS 101 and a private network having signage devices 160 can involve a secure connection or communications protocol. Moreover, in addition to routers 180, various networking components such as switches, hubs, etc., are typically involved in such communications, and although not shown in FIG. 1, certain embodiments of the present disclosure may include one or more secure networks, gateways, or firewalls that provide information security from unwanted intrusions and cyber-attacks.

Typically, a private network 160 as shown in FIG. 1 comprises a plurality of digital signage devices (e.g., 162A and 162B) configured to display digital media content. For example, digital signage devices can display facility-related announcements, weather updates, or multimedia content such as videos or movie clips. For example, in a shopping mall, a network of digital signage devices could be configured to simultaneously display information relating to a promotion at a store in the shopping mall, followed by a weather report, then an announcement informing patrons that an escalator was out of service, and then a commercial for a new soft drink. In one embodiment, each digital signage device is equipped with a Device Control Module ("DCM") (e.g., 164A or 164B) for carrying out and coordinating various computer-implemented processes of the digital signage device (e.g., 162A). Included in the DCM 164A or 164B, according to one embodiment, is a Media Acquisition Client 165A or 165B, for acquiring various media content from an MCDS 101. Further, according to one embodiment, signage devices within a private network 160 can be identified by a private IP address as will be understood by one of ordinary skill in the art.

As indicated, according to the embodiment shown in FIG. 1, the MCDS 101 is in operative connection with a private network having signage devices 160 via a network 185 connected to a router 180. According to one aspect, to prevent unwanted access to the private network 160 by hackers or others with malicious intent, and to prevent unwanted content from being delivered to the private network 160, the MCDS 101 only responds to requests from the private network 160, and sends no unsolicited content. Further, and according to the embodiment shown in FIG. 1, to maximize resources, including network bandwidth, the MCDS 101 can pre-process media content intended for a private network having signage devices 160. In one embodiment, this pre-processing includes subdividing a large media file into smaller pieces and transmitting the individual pieces to the private network 160, where they can be shared among the individual signage devices (e.g., 162A and 162B). As will be understood and appreciated, subdividing the media content such that it can be shared within the private network obviates the necessity for sending the entire media content file multiple times to the same network. This process of pre-processing content will be described in greater detail below.

The discussions above in association with FIG. 1 are merely intended to provide an overview of an embodiment of the present system. Accordingly, it will be understood that the descriptions in this disclosure are not intended to limit in any way the scope of the present disclosure. Various architectural details of an embodiment of the disclosed MCDS 101 will be described next in greater detail.

Figure 2:
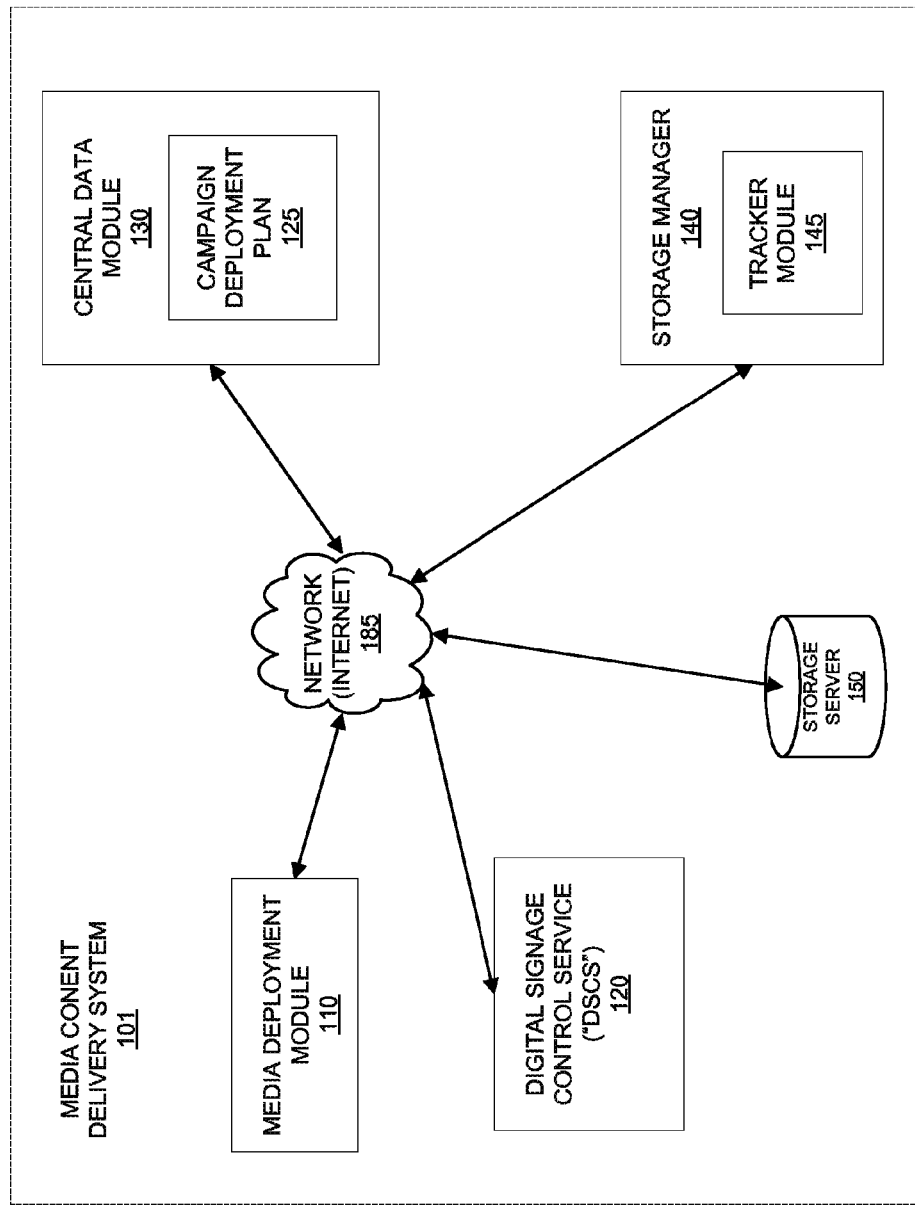
FIG. 2 illustrates an exemplary system architecture of an MCDS, according to one embodiment of the present disclosure.

FIG. 2 illustrates an exemplary system architecture 200 of an MCDS 101 according to one embodiment of the present disclosure. According to one aspect, an MCDS 101 can be a scalable cloud system. As shown and discussed previously, an MCDS 101 comprises at least a Media Deployment Module 110, a Digital Signage Control Server ("DSCS") 120, a Central Data Module 130, and a Storage Manager 140. According to one embodiment, the various components are servers or collections of modules comprising databases and various software as well as hardware. Further, according to one embodiment, components of an MCDS 101 hosted in a cloud system can be operatively connected and communicate via a network 185 (i.e., via the Internet), as shown in FIG. 2.

In general, the Media Deployment Module 110 in accordance with a user's instructions facilitates the deployment of one or more media files from one or more storage servers to one or more signage devices. The user can directly specify the selected timeslots and signage devices for displaying a media file. Alternatively, the user can specify certain criteria for selecting timeslots and signage devices for a specific campaign. The Media Deployment Module 110 then utilizes certain determination logic to determine the specific timeslots and signage devices for displaying the media file in accordance with the user's criteria.

For example, for a specific advertising campaign, a user may instruct the Media Deployment Module 110 to deploy the various media files to various timeslots at various signage devices. Based on the user's instruction, the Media Deployment Module 110 can construct a Campaign Deployment Plan 125 (i.e., an instruction for deploying media content), which, according to one embodiment, can include information relating to that particular advertising campaign. Specifically, a Campaign Deployment Plan 125 identifies particular deployment information. This deployment information can include a group ID, which identifies which group of digital signage devices have been selected to display the campaign, and/or a signage device ID, which identifies a specific signage device selected to display the campaign. For example, the group of signage devices can all belong to a private network. The deployment information can also include one or more content IDs identifying the one or more media files to be displayed at the selected timeslots of the selected signage devices. A user can create a campaign that displays the same one or more media files in one or more groups of signage devices. Alternatively, a user can create a campaign having a single media file to be displayed a single time on a single signage device.

Additionally, according to one embodiment, the deployment information can include time slot information, which indicates the date(s) and time(s) when the campaign is to be displayed. Again, a user could create a long-running campaign in which content is to be displayed multiple times each day for an entire month. Alternatively, a user could create a campaign to appear on a single signage device at a specific time. For example, and individual could create a campaign consisting of a "FURNITURE ON SALE" message that is to run on a particular signage device, on a particular date, at a particular time. Finally, in one embodiment, the deployment information may include a content ID that identifies the particular media content (e.g., a single "FURNITURE ON SALE" message, a 60-second soft drink commercial, etc.).

In certain embodiments, after the Media Deployment Module 110 determines a Campaign Deployment Plan 125 for a specific campaign, the user can review the deployment plan and then instruct the Media Deployment Module 110 to execute the Campaign Deployment Plan 125. The Media Deployment Module 110 informs the Digital Signage Control Service 120 that the specific campaign is ready to be deployed. For example, the Media Deployment Module 110 can store a Campaign Deployment Plan 125 to the Central Data Module 130 and identify that Campaign Deployment Plan 125 with a campaign ID. Subsequently, the Media Deployment Module 110 can send the campaign ID to the Digital Signage Control Service 120 and then request to the Digital Signage Control Service 120 to deploy that campaign.

In certain embodiments, the Central Data Module 130 provides a centralized data store for storing all or most information other than media files used by the MCDS 101.

As will be discussed in detail, the media files uploaded by the end users into the MCDS 101 typically are stored in the Storage Server 150. But the Central Data Module 130 can store a collection of data specifying all the media files. Data relating to a particular media file can be organized in a particular media-file data structure. For example, data relating to a particular media file can include one or more of: the title of the file, the length of the file, the size of the file, the format of the file, a description of the contents of the file, a product category of the product being presented in an advertisement file, the target audience (e.g., demographic information) of the file, the target venues at which the file should be played. Further, the data also includes a storage link which can be used to retrieve the media file from the Storage Server 150.

Additionally, the Central Data Module 130 can store a collection of data specifying each signage device (e.g., 162A and 162B) managed by the MCDS 101. Further, data relating to a particular signage device (e.g., 162A) can be organized in a particular signage device data structure. For example, data relating to the particular signage device 162A can include one or more of: a signage device ID identifying this particular signage device 162A, one or more group IDs identifying one or more groups to which this particular signage device 162A belongs, one or more network IDs identifying the one or more networks to which this particular signage device 162A belongs to, the popularity of the particular signage device 162A, and the technical specification (e.g. resolution, size, 3-D features, etc.) of the particular signage device 162A.

Further, the Central Data Module 130 can store a collection of data specifying campaign deployment plans as discussed above for each campaign. Further, data relating to a particular campaign deployment plan can be organized in a particular campaign-deployment-plan data structure. For example, data relating to a particular campaign deployment plan can include one or more of: a campaign ID identifying the campaign to which the particular deployment plan is directed, and one or more deployment entries. Each deployment entry can specify a content ID identifying a media file that is to be deployed, a group ID identifying the group of signage devices to which a media file should be deployed or a signage device ID identifying a particular signage device to which a media file should be deployed, and a timeslot in which the deployed media file should be displayed.

Further, the Central Data Module 130 can store a collection of data specifying timeslots of each signage device 162 that has been allocated to a campaign. Further, data relating to allocated timeslots of a particular signage device 162 can be organized in a particular allocated-timeslot data structure. Data relating to allocated timeslots of a particular signage device 162 can include one or more of: a signage device ID identifying the particular signage device 162 and a program entry for each of the allocated timeslots. The program entry can specify the specific time period of the associated timeslot, the price paid for that timeslot, a campaign ID identifying the campaign to which the timeslot is allocated, and a content ID identifying a media file that is to be displayed at this particular time slot.

In particular, the Central Data Module 130 receives a write instruction from the Media Deployment Module 110 specifying content and other information to be stored in the storage service in association with a particular Campaign Deployment Plan 125.

The Digital Signage Control Service ("DSCS") 120 is in communication with each of the signage devices. As described above, the Digital Signage Control Service 120 can receive a campaign deployment instruction from the Media Deployment Module 110. The campaign deployment instruction informs the DSCS 120 that a specific campaign is ready to be deployed to the intended signage devices. The DSCS 120 then can obtain a Campaign Deployment Plan 125 for that specific campaign. Based on the Campaign Deployment Plan 125, the DSCS 120 can determine what media files should be distributed to which signage devices. Using the content IDs specified in the Campaign Deployment Plan 125, the DSCS 120 can inquire the Central Data Module 130 to obtain a storage link that can be used to retrieve the corresponding media file from the Storage Server 150. Then, the next time a signage device inquires the DSCS 120 whether there is any media file to be delivered to that signage device, the DSCS 120 can inform the signage device of the media files and the associated storage links of the media files.

In certain embodiments, the Media Deployment Module 110 instructs the Digital Signage Control Service 120 that a particular campaign is ready to be deployed by sending a campaign ID to the Digital Signage Control Service 120 in a message. Using the campaign ID, the DSCS 120 can retrieve a Campaign Deployment Plan 125 from the Central Data Module 130. As described above, the Campaign Deployment Plan 125 specifies detailed information regarding a particular campaign such as what media files should be played at which signage device at which timeslots. In certain embodiments, a signage device can periodically send requests to the DSCS 120 to check if there are media files or program lists available to that signage device. The DSCS 120, in turn, can examine the Campaign Deployment Plan 125 to determine whether a media file is to be deployed to that first display device and then informs the results to the signage device.

In certain embodiments, the Storage Server 150 provides a mechanism to allow other components of the MCDS 101 to store data objects in the Storage Server 150. For example, the Storage Server 150 can provide a write function that another component can call to pass on a data object. After receiving the data object, the Storage Server 150 stores the data object and generates a data-object identifier identifying the stored data object. The Storage Server 150 can return the data-object identifier back to the component requesting to store the data object. The Storage Server 150 can further provide a read function that another component can call to retrieve a data objects stored in the Storage Server 150 using a data-object identifier. As stated, the Storage Server 150 can retrieve the data object identified by the data-object identifier and return the retrieved data object back to the component requesting to retrieve the data object.

In certain embodiments, the Storage Server 150 and its Storage Manager 140 provide a distributed mechanism to deliver media files stored in the Storage Server 150 to signage devices. Further, as discussed previously, according to one aspect of the disclosed system, the MCDS 101 may pre-process media content intended for a private network 160 to maximize network resources.

In general, as will be discussed in detail below, the Storage Manager 140 can receive from a signage device 162 in the private network 160 a request for a particular media file using a storage link. Based on the request, the Storage Manager 140 can determine whether a group of signage devices 162 in a private network 160 are interested in downloading the same particular media file. In certain embodiments, the Storage Manager 140 can divide the particular media file into the number of pieces equal to the number of the signage devices 162 in the group. Subsequently, different signage devices 162 in the private network 160 can download different pieces of the particular media file from the storage server. Then, the signage devices 162 can share the downloaded pieces among each other within the private network 160.

As shown in the FIG. 2 embodiment, the Storage Manager 140 includes various functions relating to such pre-processing. According to one embodiment and as will be discussed further, these pre-processing functions include initializing a tracker module 145, which monitors the process whereby media content is shared between digital signage devices in a private network 160.

As will be described below in detail, each signage device 162 periodically queries the DSCS 120 to check if any media file is ready to be deployed to that signage device 162. As discussed above, the DSCS 120 checks the current Campaign Deployment Plan 125 to determine whether there is any media file to be deployed to the inquiring signage device 162. When there is a media file to be deployed, the DSCS 120 returns, among other things, the storage link of the media file. The storage link indicates the location of the storage manager and the data object identifier identifying the media file stored in the Storage Server 150.

Further, a signage device 162 belonging to a particular group in a private network 160 can choose to utilize the distributed downloading mechanism provided by the Storage Manager 140. In this instance, the signage device 162 requests a Media Content Identification File of a media file (e.g., identified by a data object identifier) from the Storage Manager 140. The request can include a group ID identifying the particular group. Using the group ID, the Storage Manager 140 can query the Central Data Module 130 regarding the number of signage devices 162 in that particular group.

Further, when providing the distributed mechanism for delivering media files, the Storage Manager 140 can include a pre-processing function for segmenting (i.e., chopping) media content based on the number of digital signage devices that will be displaying the content. Again, according to one aspect, the segmenting function segments the media content into processed media content based on the number of signage devices as derived from the group ID found in the Campaign Deployment Plan 125. A group of signage devices 162 can include all signage devices 162 in the private network 160. Accordingly, the media content is intended to be displayed on every signage device in the network. On the other hand, the group can only include a subset of the signage devices 162 in the private network 160. In either case, according to the present embodiment, the segmenting function can segment the media content based on the number of signage devices that will display the media content (i.e., based on the group ID). Alternatively, the Storage Manager 140 can divide the particular media file into a default number of pieces (e.g., 20 pieces).

According to one embodiment, in addition to a function for pre-processing media content intended for a private network 160, such processes also include generating a Media Content Identification File ("MCIF") and initializing a tracker module.

Once the Storage Manager 140 has determined the number of pieces the particular media file should be divided into, the Storage Manager 140 retrieves the particular media file from the Storage Server 150 using the data object identifier included in the storage link. Then the Storage Manager 140 proceeds to segment the particular media file into the determined number of pieces. Subsequently, the Storage Manager 140 stores each piece back to the Storage Server 150, and the Storage Server 150 generates and returns a data object identifier for each stored piece. The Storage Manager 140 then informs tracker module (which will be described in detail below) of the storage links for each of the pieces of the segmented media file.

Further, according to one aspect, once media content is segmented, the Storage Manager 140 generates an MCIF corresponding to the subdivided media content. According to one aspect, an MCIF includes a listing of the individual pieces (i.e., segments) of media content identified by a descriptor, integrity data about each of the pieces, and information for identifying trackers (to be discussed below). In one embodiment, the descriptor is a unique, user-assigned key that identifies each of the segments in the Storage Server 150. In one embodiment, the descriptor identifying a segment in the Storage Server 150 will be chosen such that the segment is accessible via a specific storage link. The descriptor may also comprise the integrity data. In addition to helping identify each piece, the integrity data allows the client software at the signage device 162 to confirm that a received piece of media has maintained its original integrity since the pre-processing stage and has not become corrupted. According to one aspect, integrity data comprises an authentication tag, e.g., a cryptographic hash, as will be understood by one of ordinary skill in the art. Further, according to one aspect and as will be understood by one of ordinary skill in the art, an MCIF is akin to a torrent file, i.e., a computer file containing metadata relating to the pre-processed content to be distributed to the private network 160, which is compatible with the BitTorrent distribution system.

Further, as noted previously, the individual pieces are transmitted to the private network 160 where they can be shared among the individual signage devices, and the individual pieces can be reassembled into a single media content file. According to one embodiment, the Storage Manager 140 utilizes a tracker module 145 to monitor this process. Typically, in addition to coordinating the communications between the signage devices 162 in the private network 160, the tracker module 145 is a server that initiates the downloads of the pieces or segments of the media file. Further, the tracker 145 generally maintains information relating to the location of the particular segments, be they stored locally in a storage server of the MCDS 101 (e.g., 150), or at a particular digital signage device (e.g., 162A or 162B).

As indicated above, initially only the Storage Manager 140 processes the segments of the particular media file. Therefore, at this moment, the tracker module 145 has a record indicating the storage locations of the segments based on the storage links received from the Storage Manager 140. Therefore, when a signage device 162 queries the tracker module 145 regarding a storage location of a particular segment of the media file, the tracker module 145 returns the storage link directed to the Storage Server 150 to the signage device 162.

The tracker module 145 provides a function that a signage device 162 can call to inform the tracker module 145 of additional storage locations of particular segments of the media file. For example, after a particular signage device 162 has downloaded a particular segment, the particular signage device 162 can inform the tracker module 145 its private IP address inside the private network 160 and that it has the particular segment. The tracker module 145 accordingly updates its records to maintain that information.

As indicated, according to the embodiment shown in FIG. 1, the MCDS 101 is in operative connection with a private network having signage devices 160 via a network connected to a router 180 or similar device, which manages communications between the various components of the MCDS 101 and a private network 160. Further, signage devices within the network are assigned private IP address specific to the network. According to the preferred embodiment, as signage devices within the network only respond to conversations originated within the network, the router utilizes a process such as network address translation ("NAT"). The NAT process allows the router 180 to serve as an agent between the private network 160 and the MCDS 101 while maintaining the private IP addresses of the signage devices in the network. According to one embodiment, the router 180 utilizes NAT to map the private IP addresses to registered public IP addresses, which can be identified by the MCDS 101 such that appropriate content can be delivered to the signage devices.

As previously discussed, according to the present embodiment, signage devices are equipped with a Device Control Module ("DCM") (e.g., 164A or 164B) for carrying out and coordinating various computer-implemented processes of the digital signage device (e.g., 162A). Further according to the embodiment, the DCM 164A or 164B comprises a Media Acquisition Client 165A or 165B for acquiring various media content from an MCDS 101. In one embodiment, in response to a request for an MCIF associated with a particular media file from a DCM (e.g., 164A), a Storage Manager 140 returns the corresponding MCIF to the DCM 164A, which then transmits the MCIF to the Media Acquisition Client 165A for processing. In one embodiment, the Media Acquisition Client 165A reads the MCIF to identify a tracker module 145 that keeps storage locations of the segments of a particular media file and subsequently sends a request for the location of a particular segment of the media file. The particular segment (e.g., whether it is segment #1 or segment #19) of the media file can be selected by the Media Acquisition Client 165A randomly. Then, the Media Acquisition Client 165A receives one or more storage locations of the particular segment from the tracker module 145. The Media Acquisition Client 165A can choose a storage location and then send a request for the particular segment to the storage location.

Further, in addition to requesting and receiving media content from the MCDS 101, the Media Acquisition Client 165A requests other segments of media content from other signage devices within the network that have already received content from the MCDS 101. According to one aspect, the Media Acquisition Client (e.g., 165A) of a particular signage device (e.g., 162A) will request content from the Media Acquisition Client (e.g., 165B) of other signage devices (e.g., 162B) in the network based on the private IP addresses of the respective signage devices.

For example, when the Media Acquisition Client 165A has downloaded the segment #19 from the Storage Server 150, the Media Acquisition Client 165A informs the tracker module 145 of its private IP address inside the private network 160 and that it has the particular segment (i.e., segment #19). The tracker module 145 updates its record to indicate that, in addition to the Storage Server 150, the Media Acquisition Client 165A at the particular private IP address also possesses the particular segment. Subsequently, when the Media Acquisition Client 165B in the same private network 160 queries the storage location of the settlement #19, the tracker module 145 can inform the Media Acquisition Client 165B that both the Storage Server 150 and the Media Acquisition Client 165A at the particular private IP address have the segment #19. Therefore, the Media Acquisition Client 165B can communicate with the Media Acquisition Client 165A using its private IP address to obtain the segment #19. Similarly, the Media Acquisition Client 165B can inform the tracker module 145 of its private IP address and that it also has possession of the segment #19.

Finally, according to one embodiment, the Media Acquisition Client (e.g., 165A and 165B) of a digital signage device reassembles the segments into a representation of the media content specified for display on the signage device.

Figure 3A:
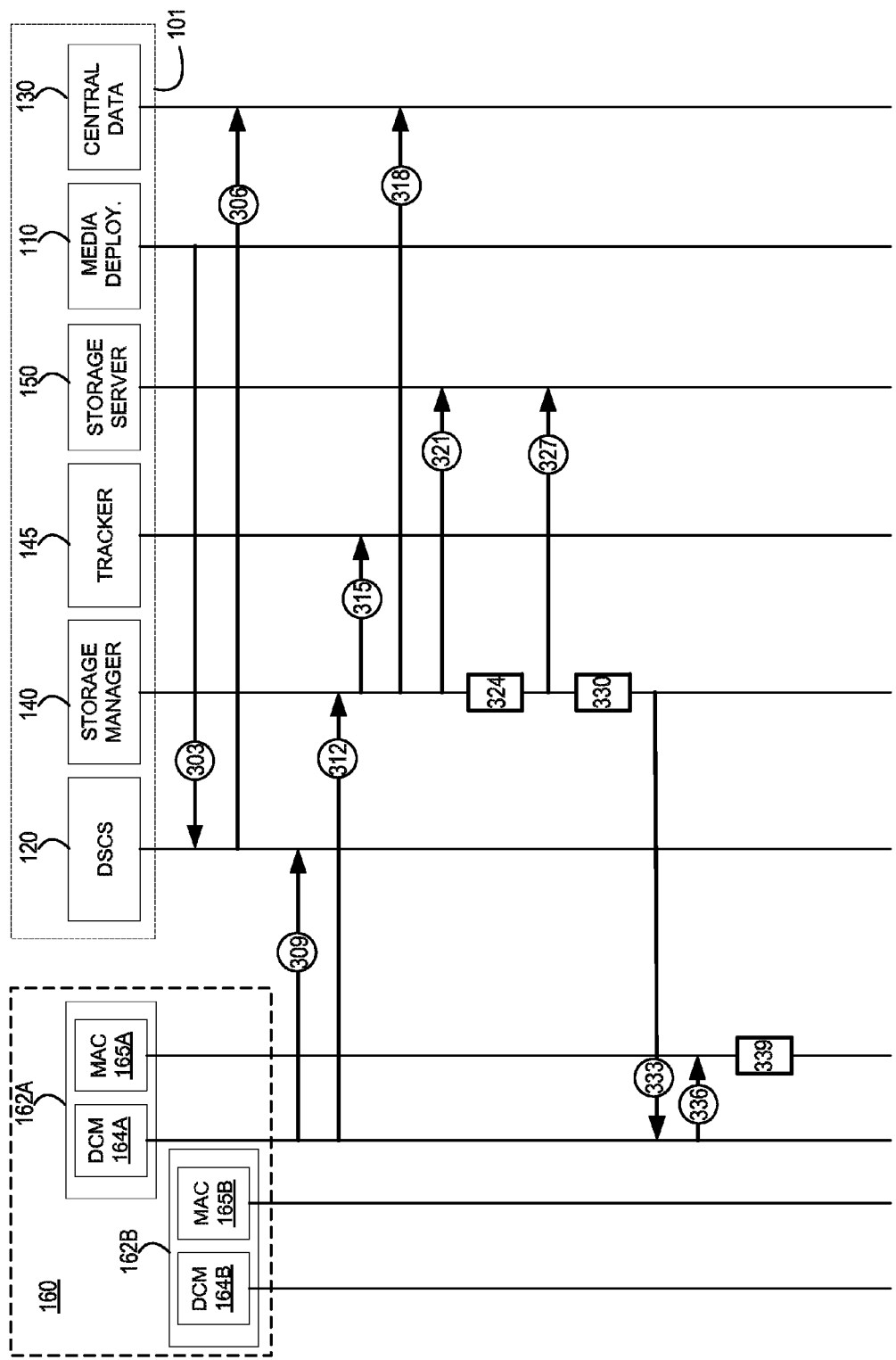

FIGS. 3A and 3B represent a sequence diagram illustrating an exemplary process whereby media content is requested by and distributed to a network of digital signage devices, according to one embodiment of the present disclosure. In the particular example, an MCDS 101 is in operative connection with a private network 160. As shown in FIG. 3A, according to one embodiment, at operation 303, a Media Deployment Module 110 transmits a media deployment instruction to the DSCS 120. As noted previously, a media deployment instruction may comprise a campaign identifier used to identify a particular Campaign Deployment Plan 125. Upon receipt of the media deployment instruction, the DSCS 120 requests the Campaign Deployment Plan 125 from the Central Data Module 130 based on the campaign identifier, at operation 306. As noted, the Campaign Deployment Plan comprises information relating to a particular advertising campaign, and according to one embodiment, this information can also include a group ID identifying the private network 160 to which the campaign is to be deployed.

As further shown in the FIG. 3A embodiment, upon receipt of the Campaign Deployment Plan 125, the DSCS 120 waits for an inquiry from a signage device within the private network 160 specified by signage device ID or the group ID in the Campaign Deployment Plan 125. As discussed previously, according to one embodiment, the signage devices 162 in the private network 160 are configured such that they receive no incoming information unless they first request information, but they periodically query the DSCS 120 (e.g., every 5 seconds). At operation 309, the DSCS 120 receives an inquiry from one of the Device Control Module ("DCM") of one of the signage devices in the specified private network having signage devices (i.e., 164A). As will be understood by one of ordinary skill in the art, in a signage device network comprising n signage devices, this initial request for content could originate from any one of the n signage devices in the network. Further, according to one aspect, the DSCS 120 can be configured to discard the Campaign Deployment Plan 125 after a predetermined time period. As will be understood and appreciated, discarding a Campaign Deployment Plan 125 after a specified time period will prevent unnecessary use of resources where a private network 160 is nonfunctioning or failing to query for content for some reason. Also, though not shown in FIG. 3A or 3B, it will be understood by one of ordinary skill in the art that as discussed previously, a router 180 or similar device manages communications between the various components of the MCDS 101 and the private network 160.

As shown in FIG. 3A, the DCM of the digital signage device 162A receives from the DSCS 120 the content ID as specified in the Campaign Deployment Plan and the storage link of the content. As noted previously, according to one embodiment, the content ID indicates to the digital signage device the particular media content that is to be displayed on the signage device and the other signage devices within the network. Continuing to operation 312, using the storage link, the DCM 164A requests the Media Content Identification File ("MCIF") corresponding to the media content identified by the content ID.

According to one embodiment and as shown in FIG. 3A, upon receipt of a first request for an MCIF by a signage device in the private network 160 identified in the Campaign Deployment Plan 125, at operation 315, the Storage Manager 140 initializes a process for pre-processing the identified media content. According to the embodiment as shown, this process begins with the initialization of a tracker module 145, which, as noted previously, monitors the process whereby media segments are shared between the digital signage devices comprising a private network 160. After initializing the tracker module 145, at operation 318, the storage module 140 requests from the Central Data Module 130 the number of signage devices in the private network 160 based on the group ID included in the Campaign Deployment Plan 125. Further, at operation 321, the Storage Manager 140 retrieves from the Storage Server 150 the media content identified by the content ID included in the Campaign Deployment Plan 125.

Upon receipt of the media content and determining the number of signage devices in the private network 160, at operation 324, the Storage Manager 140 initiates a process for segmenting the media content. As noted previously, in one embodiment, the media content is segmented into a number of pieces corresponding to the number of signage devices in the network. As will be understood by one of ordinary skill in the art, the media content could be segmented into any number of smaller pieces. Once segmented, at operation 327, the individual pieces are transmitted to the storage server 150 for storage.

Once the segments are stored in the storage server, at operation 330, the Storage Manager 140 generates an MCIF. As noted previously, according to one embodiment, the MCIF includes a listing of the segments identified by unique descriptors that identify the location of the segments within the Storage Server 150. Further, according to one embodiment, the descriptor comprises integrity data to be used by the Media Acquisition Client (e.g., 165A or 165B). Finally, at operation 333, and in response to the request for an MCIF from the DCM 164A at operation 312, the Storage Manager 140 returns the newly-generated MCIF to the DCM 164A.

Upon receipt of the MCIF, at operation 336, the DCM 164A transmits the MCIF to the Media Acquisition Client 165A, which reads then reads the MCIF at operation 339, as shown in FIGS. 3A and 3B. Continuing to FIG. 3B, subsequent to reading the MCIF, the Media Acquisition Client 165A sends a request for the location of a first segment of the specified media content, at operation 342. For purposes of the present discussion, the requested first segment will be identified as "segment 1 of n." As will be understood by one of ordinary skill in the art, however, it is not necessary that the various segments be transmitted to the private network 160 in any particular order, and according to one embodiment, the tracker module 145 monitors which pieces have been transmitted to the network. As shown in FIGS. 3A and 3B, no segments have been transmitted to the private network 160. Therefore, as shown in FIG. 3B at operation 345, the tracker module 145 notifies the Media Acquisition Client 165A that segment 1 of n is only available from the Storage Server 150.

Subsequently, as shown in the FIG. 3B embodiment, at operation 346, the Media Acquisition Client 165A requests the segment from the Storage Server 150. At operation 348, the Media Acquisition Client 165A transmits a notification to the tracker module 145 that it has retrieved segment 1 of n from the Storage Server 150 and that it has a particular private IP address. Therefore, at operation 351, according to one embodiment, the tracker module 145 updates the data table to note the private IP address associated with Media Acquisition Client 165A and indicates that segment 1 is also available from Media Acquisition Client 165A. As will be understood and appreciated, when another signage device within the network (i.e., 162B) subsequently inquires about segment 1 of n, the tracker module 145 can notify the signage device that the piece can be acquired from another signage device within the network and therefore does not need to be transferred into the network a second time.

As will be understood by one of ordinary skill in the art, other signage devices within the private network 160 will simultaneously query for media content as in operation 309. As will be further understood, upon notification from the DSCS 120 that content is available for the signage device (i.e., once the DCM of the particular signage device receives the content ID), the DCM will request the MCIF corresponding to the content ID as in operation 312. Assuming the MCIF has been created as was described in steps 315-330, the DCM will receive the MCIF as in operation 333 and the process will proceed as described in steps 336-348, albeit in reference to segment 2 of n, segment 3 of n, up to segment n of n, as will be understood by one of ordinary skill in the art.

Once a Media Acquisition Client within the network (i.e., 165B) seeks to obtain a segment that has already been delivered to the network (i.e., segment 1 of n), the process continues to operation 354 as shown in FIG. 3B. At operation 354, the Media Acquisition Client seeking the previously-delivered segment (i.e., segment 1 of n) sends a request for the location of the segment to the tracker module 145. As discussed previously in relation to operation 351, according to the present embodiment, the tracker module 145 updated the data table associated with the particular MCIF and Campaign Deployment Plan that segment 1 of n was requested by 165A. Therefore, at operation 357, the tracker module 145 notifies Media Acquisition Client 165B of the private IP address of the signage device within the network that has received the requested segment (i.e., segment 1 of n). At operation 363, Media Acquisition Client 165B requests the segment from the signage device identified by the private IP address. At operation 365 (and similar to operation 348), Media Acquisition Client 165B transmits a notification to the tracker module 145 that it has retrieved segment 1 of n from the signage device and that it has a particular private IP address.

As will be understood and appreciated, this process continues until the signage devices in the network have received each segment comprising the media content identified by the Campaign Deployment Plan 125. Subsequently, as will be understood by one of ordinary skill in the art, each Media Acquisition Client (e.g., 165A and 165B) of each digital signage device in the network (e.g., 162A and 162B) reassembles the segments into a representation of the media content identified in the Campaign Deployment Plan 125 such that the content can be displayed on the signage device according to the parameters of the Campaign Deployment Plan 125.

Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor. Method steps according to the claimed invention can be performed by a programmable processor executing a program of instructions to perform functions of the claimed invention by operating based on input data, and by generating output data. The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The foregoing description of the exemplary embodiments has been presented only for the purposes of illustration and description and is not intended to be exhaustive or to limit the inventions to the precise forms disclosed. Many modifications and variations are possible in light of the above teaching. The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A method for distributing media content with a Media Content Distribution System (MCDS), comprising:
receiving, at a Media Deployment Module (MDM) of the MCDS, an instruction to distribute an item of media content to a plurality of digital signage devices in a private network, wherein the plurality of digital signage devices comprises a first digital signage device and a second digital signage device, and the item of media content is a single video file, wherein the private network is behind a firewall, wherein the MCDS is in a public network outside the firewall;
retrieving the item of media content from a storage server of the MCDS based on information in the received instruction;
segmenting, at the MCDS, the retrieved item of media content into segments based on information in the received instruction;
storing the segments in the storage server;
obtaining storage links respectively identifying locations of the segments stored in the storage server in the public network;

upon receipt at the MCDS of a request for a first segment of the segments from the first digital signage device within the private network, transmitting the storage link identifying the location of the first segment of the segments in the public network to the first digital signage device, wherein the first digital signage device downloads the first segment of the segments from the public network and stores the first segment of the segments locally in the private network, wherein the first digital signage device sends to the MCDS a first address identifying a storage location of the first segment of the segments in the private network, wherein the first address is a private network address of the private network and is only accessible within the private network behind the firewall, wherein the private network is connected to the public network through a network address translation service;

receiving, at the MCDS, the first address;

sending, at the second digital signage within the private network and to the MCDS, requests for the first segment and a second segment of the segments;

upon receipt, at the MCDS in the public network outside the firewall, of the request for the first segment of the segments from the second digital signage device within the private network, transmitting, from the MCDS in the public network outside the firewall, the first address only accessible within the private network behind the firewall to the second digital signage device within the private network behind the firewall;

upon receipt, at the MCDS in the public network outside the firewall, of the request for the second segment of the segments from the second digital signage device within the private network, transmitting, from the MCDS in the public network outside the firewall, a second storage link identifying a location of the second segment stored in the storage server in the public network;

receiving, at the second digital signage device from the MCDS in response to the request for the first segment, the first address, and downloading the first segment of the segments from the storage location in the private network identified by the first address; and receiving, at the second digital signage device from the MCDS in response to the request for the second segment, the second storage link, and downloading the second segment from the location of storage server in the public network identified by the second storage link.

2. The method of claim 1, wherein the received instruction comprises a Campaign Deployment Plan.

3. The method of claim 1, wherein the item of media content is segmented into a number of segments, and the number equals to a number of the digital signage devices in the private network.

4. The method of claim 1, further comprising generating, at the MCDS, a media content identification file identifying the segments.

5. The method of claim 4, wherein the media content identification file comprises descriptors respectively identifying the segments.

6. The method of claim 5, wherein each of the descriptors comprises an authentication tag.

7. The method of claim 6, wherein the authentication tag is a cryptographic hash.

8. The method of claim 4, wherein the media content identification file further comprises information identifying the digital signage devices in the private network.

9. A method for distributing media files among a plurality of digital signage devices in a private network, comprising:

transmitting, from a Device Control Module (DCM) of a first digital signage device of the plurality of digital signage device, an inquiry for available media files to a Media Content Delivery System (MCDS), wherein each of the plurality of digital signage devices comprises a DCM, wherein the DCMs of the digital signage devices are in the private network and are in electronic communication with each other and with the MCDS, and wherein the plurality of digital signage devices comprises the first digital signage device and a second digital signage device, wherein the private network is behind a firewall, wherein the MCDS is in a public network outside the firewall;

upon receipt of a media content identification file at the DCM of the first digital signage device, executing the media content identification file, wherein the media content identification file identifies segments of a single media file, wherein the single media file is a single video file;

transmitting from the DCM of the first digital signage device a request for one of the segments identified in the executed media content identification file to the MCDS;

receiving, at the DCM of the first digital signage device, a storage link identifying a location of the first segment of the segments in the public network;

obtaining the first segment of the segments from the location in the public network identified by the storage link, and upon receipt of the first segment of the segments, making available at the DCM of the first digital signage device the first segment of the segments to the digital signage devices in the private network, wherein the first digital signage device stores the first segment of the segments locally in the private network, wherein the private network is connected to the public network through a network address translation service;

transmitting, from the first digital signage device within the private network behind the firewall to the MCDS in the public network outside the firewall, a first address identifying a storage location where the first segment of the segments has been stored locally in the private network, the first address being a private network address of the private network and being only accessible within the private network behind the firewall;

sending, at the second digital signage within the private network and to the MCDS, requests for the first segment and a second segment of the segments;

upon receipt, at the first address, of a request for the first segment of the segments from the second digital signage device in the private network, transmitting the first segment of the segments to the second digital signage device within the private network;

receiving, at the second digital signage device from the MCDS in response to the request for the first segment, the first address, and downloading the first segment of the segments from the storage location in the private network identified by the first address; and receiving, at the second digital signage device from the MCDS in response to the request for the second segment, the second storage link, and downloading the second segment from the location of storage server in the public network identified by the second storage link.

10. The method of claim 9, wherein the media content identification file comprises descriptors respectively identifying the segments, and a number of the segments equals to a number of the digital signage devices in the private network.

11. The method of claim 10, wherein each of the descriptors comprises an authentication tag.

12. The method of claim 11, wherein the authentication tag is a cryptographic hash.

13. The method of claim 12, further comprising authenticating the first segment of the segments by comparing the first segment of the segments to information in the media content identification file.

14. A system, comprising:
a Media Content Distribution System (MCDS) in operative connection with a private network, the MCDS comprising a Media Deployment Module (MDM) and a storage server, wherein the private network comprises a plurality of digital signage devices, and wherein the plurality of digital signage devices comprises a first digital signage device and a second digital signage device,
wherein the MCDS is configured to
  receive, at the MDM, an instruction to distribute an item of media content to the plurality of digital signage devices, wherein the item of media content is a single video file, wherein the private network is behind a firewall, wherein the MCDS is in a public network outside the firewall,
  retrieve the item of media content from the storage server based on information in the received instruction,
  segment the retrieved item of media content into segments based on information in the received instruction,
  store the segments in the storage server,
  obtain storage links respectively identifying locations of the segments stored in the storage server in the public network,
  upon receipt of a request for a first segment of the segments from the first digital signage device, transmit the storage link identifying the location of the first segment of the segments in the public network to the first digital signage device, wherein the first digital signage device downloads the first segment of the segments from the public network and stores the first segment of the segments locally in the private network, wherein the first digital signage device sends to the MCDS a first address identifying a storage location of the first segment of the segments in the private network, wherein the first address is a private network address of the private network and is only accessible within the private network behind the firewall, wherein the private network is connected to the public network through a network address translation service, and
  receive, at the MCDS, the first address;
wherein the second digital signage within the private network is configured to send, to the MCDS, requests for the first segment and a second segment of the segments;
wherein the MCDS is further configured to:
  upon receipt, at the MCDS in the public network outside the firewall, of an inquiry for the first segment of the segments from the second digital signage device, transmit, from the MCDS in the public network outside the firewall, the first address only accessible within the private network behind the firewall to the second digital signage device within the private network behind the firewall, and
  upon receipt, at the MCDS in the public network outside the firewall, of the request for the second segment of the segments from the second digital signage device within the private network, transmit, from the MCDS in the public network outside the firewall, a second storage link identifying a location of the second segment stored in the storage server in the public network;
wherein the second digital signage within the private network is configured to
  receive, from the MCDS in response to the request for the first segment, the first address, and download the first segment of the segments from the storage location in the private network identified by the first address, and
  receive, from the MCDS in response to the request for the second segment, the second storage link, and download the second segment from the location of storage server in the public network identified by the second storage link.

15. The system of claim 14, wherein the received instruction comprises a Campaign Deployment Plan.

16. The system of claim 14, wherein the media content is segmented into a number of segments, and the number equals to a number of the digital signage devices in the private network.

17. The system of claim 14, wherein the MCDS is further configured to generate a media content identification file identifying the segments.

18. The system of claim 17, wherein the media content identification file includes descriptors for the segments.

19. The system of claim 18, wherein each of the descriptors comprises an authentication tag.

20. The system of claim 19, wherein the authentication tag is a cryptographic hash.

21. The system of claim 17, wherein the media content identification file further comprises information identifying the digital signage devices in the private network.

22. The system of claim 17, wherein each of the digital signage devices comprising a Device Control Module (DCM), wherein the DCMs of the digital signage devices are in electronic communication with each other and with the MCDS.

23. The system of claim 22, wherein the DCM of the first signage device is configured to
  transmit an inquiry for available media files to the MCDS,
  upon receipt of the media content identification file, execute the media content identification file,
  transmit the request for the one of the segments to the MCDS,
  upon receipt of the first segment of the segments from the MCDS, make available the first segment of the segments to the digital signage devices in the private network, and
  upon receipt of a request for the first segment of the segments from the second signage device, transmit the first segment of the segments to the second signage device.

24. The system of claim 23, wherein the second digital signage device is configured to send the request for the first segment of the segments to the DCM of the first digital signage device based on the first address received from the MCDS.

25. The system of claim 23, wherein the DCM of the first digital signage device is further configured to authenticate the first segment of the segments by comparing the first segment of the segments to information in the media content identification file.

* * * * *